Figure 1:
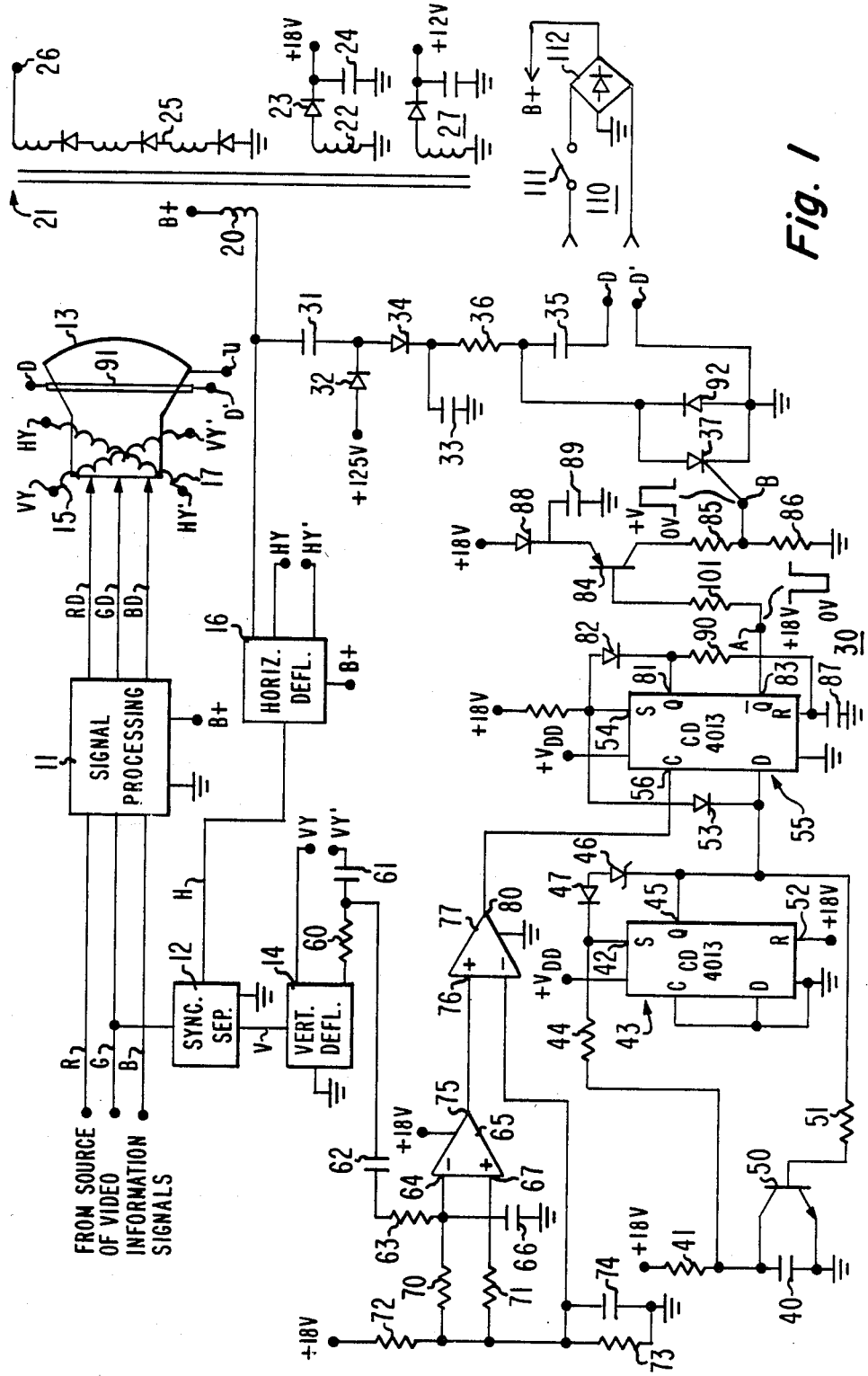

United States Patent [19]

Truskalo et al.

[11] Patent Number: 4,599,673
[45] Date of Patent: Jul. 8, 1986

[54] DEGAUSSING SYSTEM ARRANGEMENTS

[75] Inventors: Walter Truskalo, Titusville; Anthony Troiano, West Windsor Township, Mercer County, both of N.J.

[73] Assignee: RCA Corporation, Princeton, N.J.

[21] Appl. No.: 677,525

[22] Filed: Dec. 3, 1984

[51] Int. Cl.⁴ .............................................. H01N 9/29
[52] U.S. Cl. .................................................... 361/150
[58] Field of Search ............................. 361/150; 315/8

[56] References Cited

U.S. PATENT DOCUMENTS 3,274,452  9/1966  Landes ............................. 317/157.5
3,582,721  6/1971  van Hoorn et al. .............. 317/157.5
3,733,524  5/1973  Cooksey et al. ................. 317/157.5

Primary Examiner—Michael L. Gellner
Attorney, Agent, or Firm—Eugene M. Whitacre; Paul J. Rasmussen

[57] ABSTRACT

A degaussing coil and a capacitance are coupled in a resonant circuit by a switch to effect degaussing of a kinescope. The capacitance is charged by a source of relatively high voltage. A control circuit controls the operation of the switch and is responsive to a change in operating voltage applied thereto for operating the switch to effect complete discharge of the capacitance in a relatively short interval.

5 Claims, 3 Drawing Figures

Fig. 2
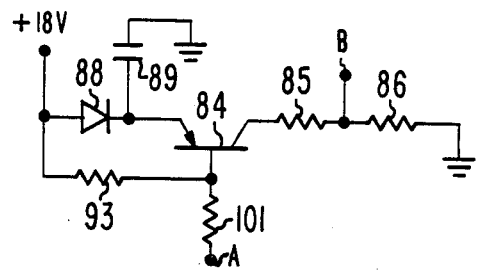
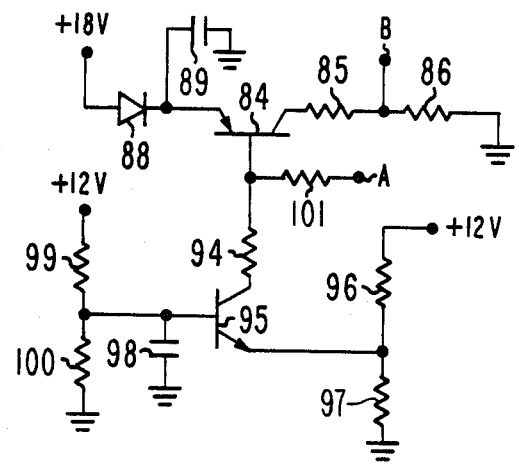
Fig. 3

DEGAUSSING SYSTEM ARRANGEMENTS

This invention relates to degaussing system arrangements for video display equipment.

Color cathode ray tubes require periodic degaussing or demagnetization to counteract the effects of the earth's magnetic field or of electromagnetic fields produced by nearby electrical devices, such as motors or appliances. These fields may magnetize metallic portions of the cathode ray tube, such as the shadow mask, causing a degradation of the color purity of the tube. Video display apparatus, such as television receivers and computer or video display monitors, usually incorporate a degaussing circuit which is operative when the apparatus is energized to produce an alternating current field that decays toward zero in order to demagnetize the metallic components in the vicinity of the tube and of the tube itself.

A resonant degaussing circuit operates by causing a capacitor coupled in a circuit with a degaussing coil to resonate. The finite Q of the resonant circuit causes the degaussing current to decay in the desired manner to effect demagnetization of the display apparatus metallic parts. Recovery of this type of degaussing circuit is very fast and requires only the time needed to recharge the capacitor, so that degaussing may be accomplished as needed without turning off the display apparatus. Additionally, the degaussing coil and resonant capacitor may be electrically isolated from the AC line, thereby simplifying insulation requirements. The resonant frequency of the degaussing circuit is of the order of 2 kHz, so that degaussing is completed in less than 5 milliseconds.

In accordance with the invention a degaussing system arrangement for a display system including a kinescope comprises a degaussing coil and a capacitance coupled in a resonant circuit by a switch. The capacitance is charged by a relatively high voltage supply. A control circuit controls operation of the switch to effect degaussing in a first mode of operation. The control circuit is responsive to a change in operating voltage level applied thereto for controlling the switch to substantially discharge the degaussing capacitance in a second mode of operation.

An aspect of the invention is that the same switch which is controlled to provide resonant degaussing is also utilized to quickly discharge the degaussing capacitance when the display system power supplies are deenergized. A further feature of the invention is that the control circuit includes apparatus for retaining an operating voltage charge upon deenergization of the display system power supplies for controlling the degaussing switch to discharge the degaussing capacitance.

In the accompanying drawing,

FIG. 1 is a schematic and block diagram of a portion of a video display apparatus, incorporating a degaussing system arrangement constructed in accordance with an aspect of the present invention; and FIGS. 2 and 3 illustrate other embodiments of the invention associated with the system of FIG. 1.

Referring to FIG. 1, there is shown a schematic and block diagram of a portion of a video display apparatus which receives video information signals from, for example, a computer. A power supply arrangement 110 includes a switch 111 which couples AC line voltage to a power supply 112. Power supply 112 is illustrative of any rectifying, filtering and regulating circuit for providing a main source of operating voltage B+ for operation of the display system. Thus, closure of switch 111 energizes the display system and thereby energizes the auxiliary voltage supplies derived from flyback transformer 21. Opening of switch 111 therefore will cause deenergization of the B+ supply as well as the voltage supplies obtained from flyback transformer 21. The video information signals may be of the form of a composite video signal incorporating chrominance and luminance information along with horizontal and vertical synchronizing information and a color oscillator burst signal. The video information signal may be provided as either a modulated or as a base band video signal. The video information signal may also be of the form of separate red, green and blue color signals (RGB signals) with the sychronizing signals incorporated in one of the color signals or as a separate input. The form of the video information signal will, of course, depend on the design of the video information signal source. For illustrative purposes, the system of FIG. 1 is shown in a form which would be responsive to separate RGB signals having demodulated, or base band, video information.

The video information signal is provided as RGB signals from a source of video information to signal processing circuits 11. The green video signal is also applied to a synchronizing pulse separator circuit 12. The signal processing circuits provide red, green and blue drive signals (RD, GD, BD) to the electron gun assembly, not shown, of a cathode ray tube 13.

The synchronizing pulse separator circuit 12 provides vertical synchronizing pulses on a conductor V to a vertical or field rate deflection circuit 14 which provides a vertical deflection current in a vertical deflection winding 15 disposed on the kinescope 13 via terminals VY and VY'. Synchronizing pulse separator circuit 12 also provides horizontal or line rate synchronizing pulses on a conductor H which are applied to a horizontal deflection circuit 16 which generates horizontal deflection current in a deflection winding 17, also disposed on cathode ray tube 13 via terminals HY and HY'.

The horizontal deflection circuit 16 also generates horizontal retrace pulses which are applied to a winding 20 of a power supply transformer 21. Power supply transformer 21 is shown as illustratively comprising a secondary winding 22 which, via rectifying diode 23 and a filter capacitor 24, provides a source of voltage of the order of +18 volts, which may be used to power other receiver circuits. Transformer 21 may comprise other secondary windings which provide other voltage supplies such as the +12 V supply 27 for circuits that operate at other voltage levels. Power transformer 21 also comprises high voltage winding 25 which generates a high voltage or ultor potential at a terminal 26 which is applied to the ultor terminal U of cathode ray tube 13.

Degaussing system 30 is of the resonant or ring-down type. When the video display apparatus is energized, horizontal retrace pulses having an amplitude of the order of 800 volts begin to charge capacitor 31. Diode 32 clamps capacitor 31 to the −125 volt supply in order to increase the voltage across capacitor 31 to approximately 925 volts. The voltage across capacitor 31 than charges capacitor 33 to approximately 925 volts through rectifying diode 34 during the course of 5–10 horizontal deflection cycles.

The voltage developed across capacitor 33 causes capacitor 35 to also become charged to 925 volts through current limiting resistor 36. Resistor 36 limits the current flow to prevent the generation of any electromagnetic fields that could magnetize metallic components of the video display apparatus. Capacitor 35 becomes fully charged in approximately 2 seconds. With capacitor 35 charged, degaussing circuit 30 becomes enabled and is energized when SCR 37 is triggered.

The trigger pulse for SCR 37 is generated in the following manner. Upon turn-on of the display system, the +18 volt supply will cause capacitor 40 to charge to approximately 9 volts through resistor 41. This voltage, applied to the SET input 42 of flip-flop 43 through resistor 44, causes the Q output 45 of flip-flop 43 to change to a logic 1 stage, having a level of approximately +18 volts. This voltage, applied to the base of transistor 50 through resistor 51, causes transistor 50 to conduct, thereby discharging capacitor 40. Zener diode 46 and diode 47 cause a voltage to be applied to input 42 of flip-flop 43 to maintain flip-flop 43 in its logic 1 state. The voltage applied to the SET input 42 will be approximately 6 volts below the Q output 45 level of +18 volts, due to the voltage drop provided by zener diode 46 and diode 47. The RESET input 52 will maintain the same voltage as output 45. The lower voltage at input 42 provides hysteresis to allow flip-flop 43 to reset quickly when power is removed temporarily in order to allow degaussing to occur when power is reapplied. The hysteresis effect operates as follows. Both the SET input 42 and the RESET input 52 require approximately 9 volts to maintain a logic 1 state. Since input 42 is held at about 6 volts below that of input 52 by action of zener diode 46 and diode 47, removal of power from flip-flop 43 will cause the SET input 42 to lose its logic 1 state while the RESET input 53 is still in a logic 1. This causes flip-flop 43 to reset.

A logic 1 at output terminal 45 will cause diode 53 to become reverse biased which applies a voltage to the SET input 54 of flip-flop 55 sufficient to allow flip-flop 55 to go to a logic 1 state. Flip-flop 55 does not change to a logic 1 state, however, until a positive going pulse is received at CLOCK input 56. The $+V_{DD}$ terminals of flip-flops 43 and 55 of the control circuit provide operating supply voltage thereto and may be energized from the +18 V or +12 V supplies.

The positive going pulse at CLOCK input 56 is generated as follows. A vertical rate sawtooth signal representative of vertical yoke current is sampled via sampling resistor 60 and capacitor 61 from the return conductor of the vertical deflection winding 15. The sampled waveform is applied via a capacitor 62 and a resistor 63 to the inverting input 64 of an operational amplifier or comparator 65. The sampled waveform is AC coupled via capacitor 62 so that it varies positively and negatively about zero. The time constant of the circuit which applies the sampled waveform to comparator 65 causes the waveform to pass through zero slightly before the center of the vertical trace interval. This permits degaussing to begin just before the middle of vertical trace so that it ends before any appreciable vertical deflection current has been produced. Capacitor 66, also coupled to inverting input 64, filters any horizontal rate signals from the vertical rate sawtooth signal that may have been undesirably coupled into the vertical rate current via the deflection yoke. Both the inverting input 64 and the noninverting input 67 are biased to one-half the supply voltage, i.e., 9 volts, by resistors 70 and 71, respectively, and by a voltage divider established by resistors 72 and 73. Capacitor 74 provides a bypass path for the voltage divider. The sampled vertical waveform is referenced to this bias voltage and swings above and below it. The gain of comparator 65 is very high, so that the oiutput 75 will essentially switch between zero and +18 volts as the voltage on the inverting input 64 falls below that on the noninverting input 67. This occurs as the sawtooth waveform passes from positive to negative near the center of vertical trace, which is the vertical current zero crossing. The output 75 of comparator 65 is connected to the noninverting input 76 of a comparator 77. As the output 75 of comparator 65 goes high at the vertical deflection current zero crossing, the output 80 of comparator 77 will also go high. Comparator 77 shortens the rise time of the positive going pulse from comparator 65.

This positive going pulse is applied to the CLOCK input 56 of flip-flop 55 and causes the Q output 81 of flip-flop 55 to change to a logic 1 state. This reverse-biases diode 82 which applies a voltage to SET input 54 that maintains flip-flop 55 in a logic 1 state until power is removed. The NOT Q output 83 of flip-flop 55 will switch to a logic 0 state which forward biases transistor 84, causing it to saturate so that current flows through resistors 85 and 86. The voltage drop across resistor 86 will trigger SCR 37, initiating the degaussing operation. The logic 1 state of approximately +18 volts on Q output 81 of flip-flop 55 causes capacitor 87 to charge via resistor 90. After approximately 12 milliseconds, flip-flop 55 is reset, which causes both Q output 81 and NOT Q output 83 to maintain logic 1 state. When NOT Q output 83 switches to a logic 1 state, transistor 84 becomes reverse biased, and SCR 37 turns off. The drive pulse for transistor 84 is obtained from flip-flop 55 and applied through resistor 101 and is illustrated at terminal A as a negative going pulse having voltage levels of substantially +18 and 0 volts. Transistor 84 inverts this pulse to a positive going pulse at terminal B to gate SCR 37 into conduction to begin degaussing. The positive level of this pulse is determined by the voltage divider comprising resistors 85 and 86. Resistor 86 also serves to bypass leakage current from transistor 84 to stabilize triggering of SCR 37.

When SCR 37 is triggered into conduction, capacitor 35 discharges through SCR 37 and the degaussing coil 91, located on cathode ray tube 13, via terminals D and D'. As capacitor 35 discharges, the current flow in degaussing coil 91 causes the magnetic field produced by the coil to increase. When capacitor 35 is completely discharged, current will continue to flow in degaussing coil 91, and capacitor 35 will become oppositely charged. The magnetic field produced by coil 91 will collapse as the degaussing current falls, until the current is zero the capacitor 35 is charged. Capacitor 35 will then discharge through the degaussing coils 91 and diode 92 back to capacitor 35 where capacitor 35 becomes charged again. Capacitor 35 then discharges through SCR 37 and degaussing coil 91 to begin another cycle. SCR 37 and diode 92 thus function as a switch to couple the degaussing coil 91 and capacitance 35 to resonate to effect degaussing of kinescope 13. Losses in the circuit components will cause the degaussing current to decrease each cycle, so that the degaussing current rings in an AC manner down to zero, thereby demagnetizing the metallic parts of the cathode ray tube 13 and the video display apparatus. The degaussing operation occurs in approximately 5 milliseconds, while the vertical deflection current is still substantially zero. As previously described, the SCR is triggered for approximately 12 milliseconds which is sufficiently long that degaussing is completed while the SCR is conducting. This prevents any residual degaussing current from remagnetizing the cathode ray tube after the SCR 37 is turned off.

What has been described thus far is the normal operation of degaussing system during normal operating conditions of the monitor or display system. It has been determined that it is desirable to lower the relatively high voltage to which capacitor 35 is charged in a relatively short interval following the turn-off of power to the display system. The quick discharge increases operator safety in the event the monitor must be serviced quickly after power turn-off. In this respect it has been determined that inherent current leakage paths associated with capacitor 35 cannot be relied upon to discharge the capacitor quickly enough. Further, the inclusion of an impedance, such as a resistor, across capacitor 35 is unsatisfactory because such resistance would unduly load the high voltage source and also undesirably damp the resonant degaussing circuit, thereby decreasing efficiency of degaussing. In accordance with an aspect of the invention, capacitance 35 can be discharged relatively quickly if SCR 37 is maintained in a conducting condition following turn-off of all operating power supplies.

In FIG. 1, this feature of the invention is accomplished by the inclusion of diode 88 and capacitor 89 in the emitter circuit of gate drive transistor 84 during normal operation. With the 18 V present, diode 88 conducts and capacitor 89 is charged to the +18 V. Thus during normal operation in a first mode of operation, the control circuit including diode 88 and capacitor 89 serves to control the degaussing switch comprising SCR 37 and diode 92 to effect resonant degaussing. Upon turn-off of the power supply, the 18 V supply as well as the 125 V supply and the horizontal retrace pulses all will start to decay. However, with SCR 37 open, capacitor 35 will remain charged to the high voltage level. In accordance with an aspect of the invention, diode 88 prevents the discharge of capacitor 89 back through the 18 V supply. Instead, capacitor 89 serves as a continuing current source for the emitter of transistor 84. Because the 18 V supply also energizes the flip-flop 55, when the 18 V supply decays the voltage level at terminal 83 of flip-flop 55 also decays toward zero. When the voltage at point A decreases below the voltage level maintained at capacitor 89, transistor 84 conducts and supplies a gate drive signal at terminal B sufficient to turn on SCR 37. With SCR 37 conducting capacitor 35 is able to discharge in a relatively short time because it is no longer being charged in the absence of horizontal retrace pulses. The value of capacitor 89 and the resistance of resistors 85 and 86 determines the time constant for the discharge of capacitor 89. This time constant determines the conduction time of transistor 84 and this conduction time is selected to be long enough to cause SCR 37 to conduct beyond the time necessary to completely discharge capacitor 35.

FIG. 2 illustrates an alternative arrangement for the control circuit of the degaussing system. The arrangement of FIG. 2 is intended to replace the circuitry coupled between terminals A and B of FIG. 1. As illustrated, the only difference in the FIG. 2 embodiment is the addition of resistor 93 which is coupled from the 18 V supply to the base of transistor 84. This resistor ensures that upon turn-off of the 18 V supply, the base of PNP transistor 84 would be lowered in voltage as the supply decays even if other types of flip-flop 55 were utilized. The illustrated flip-flop 55 is of a commercial type CD 4013, the terminal 83 output of which lowers to ground potential when the 18 V supply decays. However, other types of flip-flops may leave the corresponding terminal 83 floating, in which case resistor 93 actively causes the base electrode of transistor 84 to lower as the +18 V supply decays. This, in turn, causes conduction of transistor 84 in the control circuit as described in conjunction with FIG. 1 to effect discharge of the voltage across capacitor 35.

FIG. 3 illustrates another embodiment of the control circuit portion of the degaussing system arrangement which may be substituted at the terminals A and B of FIG. 1. The operation of the top portion of the FIG. 3 arrangement including diode 88, capacitor 89, transistor 84 and resistors 85 and 86 is as described in conjunction with FIGS. 1 and 2. The circuitry coupled to terminal A serves to drive the base of transistor 84 in a negative direction when the 18 V supply decreases upon turn-off of the display system. During normal operation, the voltage divider comprising resistors 99 and 100 in the base circuit of transistor 95 and the voltage divider comprising resistors 96 and 97 in the emitter circuitry of transistor 95 causes transistor 95 to remain nonconducting. However, capacitor 98 in the base circuit is charged from the 12 V supply through resistor 99. When power is removed from the display system the 18 V supply, as well as the 12 V supply in FIG. 3, decay rapidly toward zero. Thus the emitter potential of transistor 95 rapidly approaches zero volts and a positive base potential supplied by the charge on capacitor 98 causes transistor 95 to conduct. This supplies a low potential base current path for transistor 84 which ensures its conduction. Conduction of transistor 84 in turn controls SCR 37 to conduct the discharge capacitor 35. Transistor 95 and hence transistor 84, will conduct as long as the base-emitter of transistor 95 is forward biased. This in turn is determined by the capacitance of capacitor 98 and the value of resistor 100 through which it discharges. This time constant is selected to be long enough to completely discharge capacitor 35. In the FIG. 3 embodiment, it is noted that during normal operation when the display system is operating, transistor 95 is nonconducting and the base drive for transistor 84 is supplied from flip-flop 55 as illustrated in FIG. 1 to control the normal resonant degaussing action. Thus, the control circuit initiates an effective degaussing action upon turn-off of the system such that capacitor 35 is completely discharged and remains discharged until the display system is once again turned on for normal operation.

What is claimed is:
1. A degaussing system arrangement comprising:
   a degaussing coil associated with a kinescope;
   a capacitance coupled to said degaussing coil;
   a first source of voltage coupled to charge said capacitance;
   switch means operative to couple said degaussing coil and capacitance means in a resonant circuit for effective degaussing of said kinescope;
   a second source of voltage;
   control means coupled to said second source of voltage and to said switching means for controlling said switching means to effect resonant degaussing action in a first mode of operation when said first and second sources of voltage are energized and for controlling said switching means for discharging said capacitance in a second mode of operation when said first and second sources of voltage are deenergized.

2. A degaussing system arrangement according to claim 1 wherein said first and second voltage sources are provided by a common voltage generator such that said first and second voltage source are energized and deenergized at the same time.

3. A degaussing system arrangement according to claim 2 wherein said capacitance means remains charged for an interval following the deenergization of said first and second voltage sources and is discharged substantially completely during said second mode of operation.

4. A degaussing system arrangement according to claim 1, wherein said control means includes means for being charged from said second source of voltage and for retaining said charge upon deenergization of said first and second sources of voltage for controlling said switch means in said second mode of operation.

5. A degaussing system arrangement according to claim 4, wherein said switch means causes resonant degaussing during said second mode of operation whereby said capacitance means becomes discharged.

* * * * *